Dec. 24, 1957  J. T. HOBAN  2,817,510
REBOUND BUMPER
Filed Sept. 4, 1953
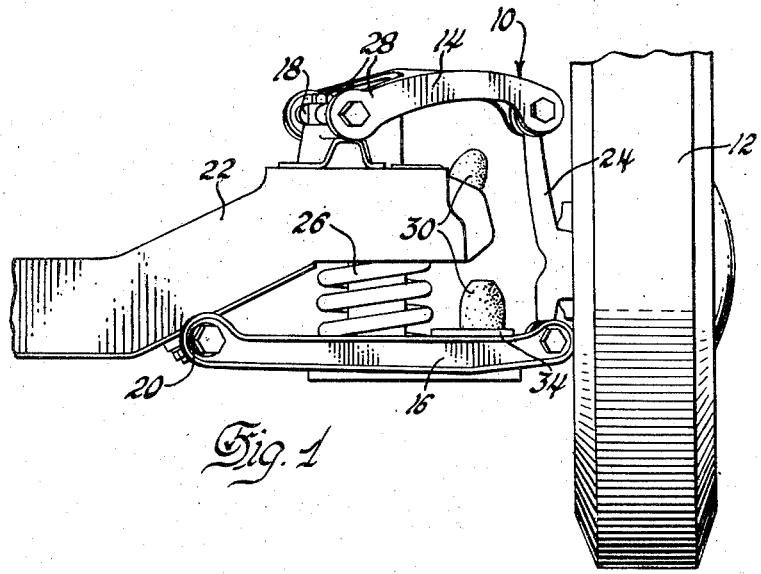
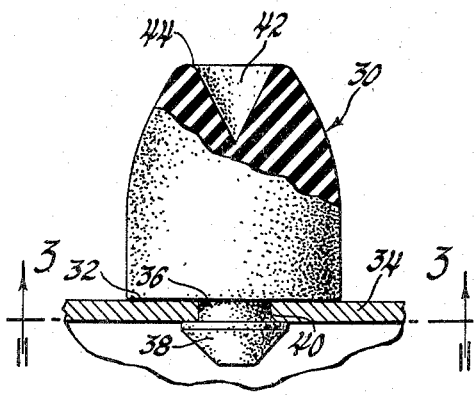
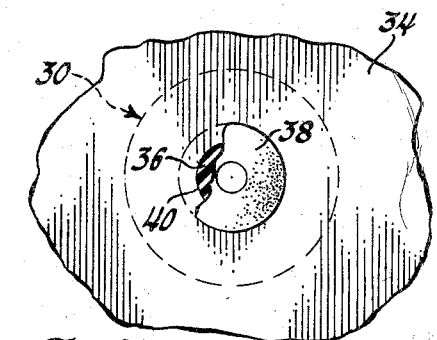
INVENTOR
John T. Hoban
BY L. D. Burch
ATTORNEY

United States Patent Office 2,817,510
Patented Dec. 24, 1957

2,817,510

REBOUND BUMPER

John T. Hoban, Detroit, Mich., assignor to General Motors Corporation, Detroit, Mich., a corporation of Delaware Application September 4, 1953, Serial No. 378,493

3 Claims. (Cl. 267—63)

This invention relates to rebound bumpers such as are adapted to cushion, check, or absorb the force of impact between engaging members.

Where it is desirable to absorb the shock of an applied force it is customary to secure a yieldably deformable element to one of the engaging members at the point of contact. One means of securing a bumper element to a member is by having fastening means formed integrally with the bumper and adapted to be received within an aperture formed through the member. Where such fastening means are employed it has been found that the serviceable life of the bumper element is considerably reduced even though highly resilient and flexible materials are used to form such elements. The force applied to the bumper is resisted by the compression of the resilient material against the member to which it is secured while the portion of the bumper about the aperture formed therein is subjected to adverse shearing forces. Although the use of other fastening means might increase the serviceable life of the bumper element the cost of using other means would also be greater.

It is now proposed to provide a bumper element which is adapted to receive and absorb repeated blows of great magnitude without adverse effects upon the element or its fastening means. It is proposed to relieve the impact receiving surface of the bumper element directly over the fastening means to enable a more uniform distribution of the impact forces throughout the element and for substantially isolating the portion of the element having the fastening means formed thereon from adverse shearing forces. The proposed bumper is simply constructed, inexpensively manufactured, easily secured in position, and has a serviceable life many times in excess of similar elements presently in use.

Figure 1 is a front elevational view of a vehicle wheel suspension system having the present invention employed therewith.

Figure 2 is a side elevational view of the proposed bumper element partly broken away and shown in section.

Figure 3 is a bottom view of the proposed bumper element secured in place as taken in the plane of line 3—3 of Figure 2 and viewed in the direction of the arrows thereon.

An independent suspension system 10 for a vehicle wheel 12 generally comprises an upper wishbone arm 14 and a lower wishbone arm 16 pivotally mounted as at 18 and 20 upon the vehicle frame 22 and the king pin 24 respectively. A coil spring 26 is disposed between the lower wishbone arm 16 and the frame 22 and spring biasing means are associated with the wishbone arms, as shown at 28, to provide sufficient elasticity for the suspension system and to hold the arms 14 and 16 in their relative wheel supporting positions. Under rough road conditions the suspension system 10 is subjected to forces of a greater magnitude than normal which repeatedly displace the wheel 12 and cause the suspension arms 14 and 16 to alternately strike the frame 22 during their respective rise and descent. To prevent a metal to metal contact between the frame 22 and the suspension arms 14 and 16 a bumper element 30 is positioned at the point of contact. The bumper 30 may be secured to either of the engaging members and in Figure 1 one such element is shown secured to the stationary frame member 22 and another rebound bumper is shown secured to the movable wishbone arm 16.

The bumper element 30 is made of a solid piece of resilient material and is substantially frusto-conical in shape. The base portion 32 seats upon one of the engaging members as upon plate 34 secured to the suspension arm 16. Formed integrally with the bumper element 30 and projecting centrally from the base portion 32 is a cylindrical shank 36 having a button 38 formed on its extended end. The shank 36 is adapted to extend through an aperture 40 formed in the plate 34 and the button to engage the underside thereof for holding the bumper element in place.

A conical depression 42 is formed centrally within the top of the bumper element 30. The removal of the conical section leaves an annular ring 44 at the upper end of the bumper element to receive the applied force. The ring 44 is concentrically aligned with respect to the shank 36 but is of a greater diameter than the shank or the aperture 40. Forces acting upon the ring 44 are thus distributed more uniformly through the bumper element 30 compressing the element against the plate 34 rather than through the aperture 40 and greatly minimizing the shearing forces previously present about the shank 36.

I claim:

1. A frustum-shaped rebound bumper member of yieldably deformable material and having means provided centrally of and at the larger end thereof for fastening said bumper member to a supporting member and seating said larger end thereagainst, a depression formed within the smaller end of said bumper member directly over said fastening means and providing an impact receiving ring at said smaller end disposed concentric with and radially outward of said fastening means, said impact receiving ring being disposed to distribute impact forces received thereby through said bumper member and outwardly of said fastening means to the larger end thereof seated against said supporting member.

2. A substantially frusto-conical rebound bumper member of yieldably deformable material and having means provided centrally of and at the larger end thereof for fastening said bumper member to a supporting member and seating said larger end thereagainst, a conical depression formed within the smaller end of said bumper member directly over said fastening means and providing an annular impact receiving ring at said smaller end disposed concentric with and radially outward of said fastening means, said impact receiving ring being disposed to distribute impact forces received thereby through said bumper member and outwardly of said fastening means to the larger end thereof seated against said supporting member.

3. A frusto-conical rebound bumper member of yieldably deformable material and including a shank portion formed centrally of and from the larger end thereof and provided with a button portion at the end thereof, said shank and button portions being receivable through an opening in a supporting member for seating and maintaining the larger end of said bumper members against said supporting member by engagement of said button portion with the underside thereof, a conical depression formed within the smaller end of said bumper member directly over said shank portion and providing an annular impact receiving ring at said smaller end disposed concentric with and radially outward of said shank portion, said impact receiving ring being disposed to distribute impact forces received thereby through said bumper member to the part of said larger end thereof seated against said supporting member and to the exclusion of that part thereof from which said shank portion is formed.

References Cited in the file of this patent

UNITED STATES PATENTS

| | | | |
|---|---|---|---|
| 1,563,876 | Smith | Dec. 1, | 1925 |
| 1,915,249 | Jorgensen | June 20, | 1933 |
| 2,096,118 | Leighton | Oct. 19, | 1937 |
| 2,140,002 | Dion | Dec. 13, | 1938 |
| 2,148,177 | Sherman | Feb. 21, | 1939 |
| 2,321,832 | Leighton | June 15, | 1943 |
| 2,328,378 | Dudley | Aug. 31, | 1943 |
| 2,414,674 | Slack et al. | Jan. 21, | 1947 |